3,029,734
SEPARATION OF STAGES IN A STAGED ROCKET
Ray E. Allenson, Los Alamos, N. Mex., assignor to Phillips Petroleum Company, a corporation of Delaware
Filed Oct. 2, 1958, Ser. No. 764,996
3 Claims. (Cl. 102—49)

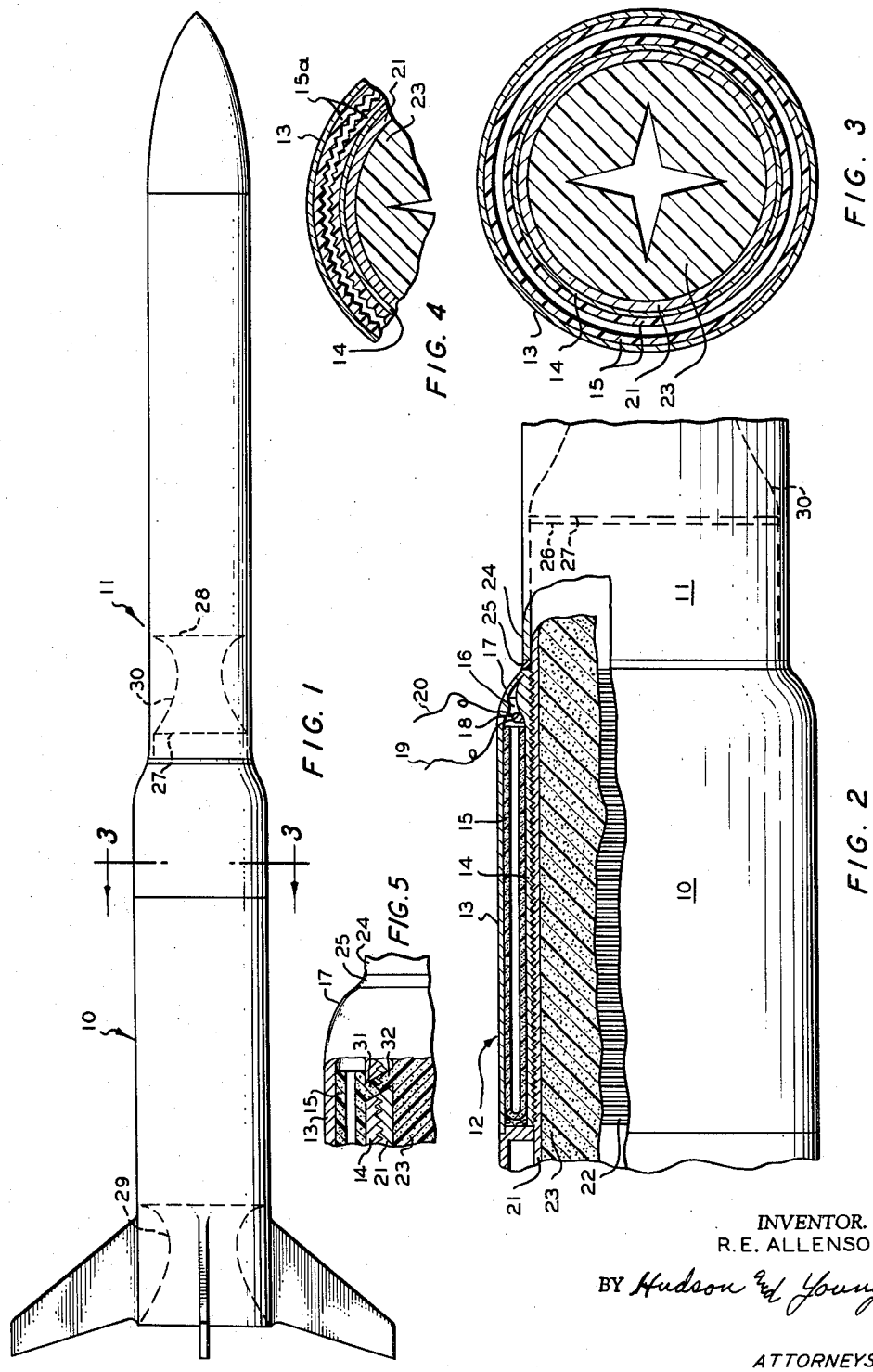
April 17, 1962 — R. E. ALLENSON — 3,029,734
SEPARATION OF STAGES IN A STAGED ROCKET
Filed Oct. 2, 1958
INVENTOR.
R. E. ALLENSON
BY Hudson & Young
ATTORNEYS United States Patent Office 3,029,734
Patented Apr. 17, 1962

This invention relates to the separation of propulsion stages and/or separation of payload from the propulsion stage of a rocket propelled system. In one aspect it relates to a novel reverse thrust motor for detaching the exhausted stage of a multistage rocket. In another aspect it relates to a novel reverse thrust motor for decelerating the forward thrust of a rocket-powered vehicle.

In the utilization of multistage rockets it is desirable that the exhausted stage or booster stage be positively disengaged when this stage is to be jettisoned. It is also desirable to provide means for decelerating the forward thrust of rocket motors which are utilized as the motivating force for airborne vehicles which are to be returned to the earth intact. Various means have been proposed for termination of forward thrust in rocket motors; however, certain disadvantages attendant these proposed means have resulted in their falling short of the desired goal. When rocket stages are to be separated, it is essential that the reverse thrust applied be substantially balanced in order to insure that the forward stages will not be deviated from their predetermined course.

It is, therefore, an object of this invention to provide a means for instantaneous and balanced application of reverse thrust to an exhausted stage of a multistage rocket.

It is an other object of this invention to provide a novel reverse thrust rocket motor wherein balanced thrust is assured.

Other and further objects and advantages of this invention will be apparent to one skilled in the art on study of the disclosure of this invention, including the drawing wherein:

FIGURE 1 represents a two-stage rocket having the reverse thrust motor of this invention incorporated therein;

FIGURE 2 is a partial sectional view of the booster stage of the rocket of FIGURE 1;

FIGURE 3 is a sectional view taken along lines 3—3 of FIGURE 1;

FIGURE 4 is a modification of the annular motor shown in FIGURE 3; and

FIGURE 5 is a modification of the ignition means shown in FIGURE 2.

Broadly, the invention contemplates a means for applying a substantially uniform reverse thrust to the entire axial periphery of the rocket motor. The principal utility of this novel rocket motor is for the positive disengagement of the rearmost stage of a multistage rocket motor; however, this motor has utility for decelerating the forward thrust of any rocket motor, e.g., the rocket motor used for propelling an airborne vehicle. The novel motor of this invention comprises an annular rocket surrounding the principal rocket motor with the nozzle pointing forward. The forward pointing nozzle is preferably slightly canted outwardly and is sealed by a strip of metal which also acts as fairing to cut down air drag prior to operation of this rocket. The reverse thrust rocket motor is powered by a solid propellant having an annular perforation therein. The solid propellant can be any of the known solid propellants and will usually be the same as that used in the principal rocket.

A better understanding of the invention may be had by reference to the drawing wherein FIGURE 1 represents a view of the two-stage rocket motor comprising the first or booster stage 10 having incorporated therein the annular reverse thrust motor of this invention and the second stage 11 having the second stage motor and payload portion of the rocket. In the various figures like numerals are employed to designate like elements. The exhaust nozzle 30 of second stage 11 is indicated with the forward end 28 adjacent the propellant charge of second stage 11 (not shown) and the rear end 27 adjacent the forward end 26 of the first stage, as shown in FIGURE 2. The first stage nozzle is indicated at 29.

In FIGURE 2 the first stage 10 is shown as comprising annular motor 12 having an outer shell 13, an inner shell 14, and a perforated solid charge 15. The nozzle 16 is an annular opening and is sealed by the fairing strip 17 which joins the outer shell 13 and the inner shell 14. Ignition means 18 is shown as an annular electrical squib with connections 19 and 20 for connecting the squib to a source of power (not shown). The igniter 18 can be placed adjacent the nozzle 16 as shown but is preferably placed at the opposite end of the rocket motor to facilitate uniform ignition of the solid propellant charge. The shell 21 of booster stage rocket motor 10 is threaded as shown at 22 to mesh with matching threads on reverse thrust motor 12. The annular motor 12 can be attached to the principal rocket motor by a threaded connection as shown or can be attached by spot welding or other known means. The propellant charge of the first stage of the principal rocket motor is shown at 23.

The stages of the multistage rocket can be joined by a friction-fit, telescopic joint as illustrated wherein a sleeve 24 of the forward stage 11 fits snugly over the shell 21 of the rearward stage 10. A resilient bumper ring 25 is advantageously employed to absorb jars communicated from one stage to the other.

FIGURE 3 shows the relationship of the annular motor to the principal motor in sectional view.

FIGURE 4 is a view in cross section of a portion of an annular motor similar to that of FIGURE 3 and shows a modification of the configuration of the propellant charge 15a of the annular motor 12 wherein the perforation comprises a series of ridges and valleys so as to provide a more nearly uniform total burning surface throughout the burning period. The purpose of this configuration is to provide a more nearly uniform pressure in the combustion chamber of the annular motor during the firing period and has particular utility in those applications where the vehicle to which the motor is attached is to be returned to earth intact. In the modification shown in FIGURES 2 and 3 where the perforation of the annular motor 12 takes the form of a smooth right cylinder, the pressure in the combustion chamber rises throughout the burning period and can result in bursting the annular motor 12. This is not a disadvantage where the motor is utilized for separating an exhausted stage from a multistage rocket and can be considered beneficial in that the jettisoned stage will be at least partially disintegrated before falling to the earth.

Either the motor of modification of FIGURES 2 and 3 or that of FIGURE 4 provides superior performance for the intended purpose in that a large area of burning surface is immediately exposed and a sudden burst of power is obtained. Furthermore, insulation problems are minimized in that the propellant charge provides insulation for the combustion chamber wall substantially throughout the period of firing. An end-burning propellant grain does not provide the large area of burning surface, with respect to space occupied, as is provided by the annular motor of the present invention, and the combustion chamber walls of such motor would require the protection of some insulation means.

FIGURE 5 is a view in cross section of a modification of the means for igniting the propellant charge of annular motor 12. The inner wall 14 of annular motor 12 is provided with a port 31 which is filled with solid propellant so as to be contiguous with the propellant charge of annular motor 12. The outer wall 21 of first stage motor 10 is provided with a port 32, located so as to be in alignment with port 31 when annular motor 12 and first stage motor 10 are assembled. Port 32 is also filled with propellant so as to be contiguous with propellant charge 23 of motor 10 and the propellant of port 31. Thus, when the propellant charge of motor 10 is consumed, the propellant charge of annular motor 12 will be ignited to cause separation of exhausted first stage motor 10 from the second stage 11.

The charge for the annular motor can be fabricated by extruding or otherwise forming hollow, right cylinders to form the inside and outside walls of the propellant charge forming the combustion chamber and these hollow cylinders can then be case bonded to the walls of the motor. The end opposite the nozzle can be machined or otherwise fabricated from a ring of the propellant composition to butt against the ends of the two cylinders of propellant material. In one modification the ends of the propellant cylinders opposite the nozzle need not be joined together by a ring of propellant but can be seated in restrictor material such as that used for bonding the grains to the rocket motor walls so that the end of the annular motor is protected from the gases resulting from combustion of the propellant. Bonding agents which act as restrictors are well known in the art.

The solid propellant used in the annular motor can be any solid propellant; however, for economic reasons the propellant will usually be the same as that used in the principal charge.

A solid propellant composition which is usually preferred at the present time is one which is pressure sensitive so that the burning rate is proportional to the pressure and a pressure of several hundred pounds is necessary to maintain a burning rate sufficient for continuous combustion. One preferred type of solid propellant comprises 50 to 90 weight percent ammonium nitrate, 10 to 50 weight percent of a rubber copolymer of a conjugated diene and a polymerizable heterocyclic nitrogen compound, a burning rate catalyst, such as milori blue, and appropriate curing agents. Such propellant composition requires a pressure of about 200 p.s.i. to maintain the combustion and the combustion rate increases at increasing pressure.

Reasonable variations and modifications are possible within the scope of this disclosure without departing from the spirit and scope of the invention.

That which is claimed is:

1. In a multistage rocket comprising a booster stage rocket having a combustion chamber containing a solid propellant charge and an exhaust nozzle and at least one secondary stage, means for disengaging said booster stage comprising separable means connecting the booster stage to the second stage; an annular rocket motor comprising an annular combustion chamber and an annular nozzle, pointed so as to produce thrust opposite to the direction of flight of said booster stage rocket, concentrically secured to the external periphery of said booster stage; an annular, internal-burning, solid propellant charge comprising two spaced, concentric right hollow cylinders of solid propellant positioned in said annular combustion chamber; and means to ignite said propellant charge.

2. A multistage rocket according to claim 1 wherein the means to ignite the propellant charge in said disengaging means comprises a strand of solid propellant which is contiguous with the solid propellant charge in said disengaging means and the solid propellant charge in said booster stage rocket.

3. In a miltistage rocket comprising a booster stage rocket having a combustion chamber, a propellant adapted for burning in said combustion chamber, a nozzle for exhausting propelling gases, and at least one secondary stage, means for disengaging said booster stage comprising separable means connecting the booster stage to the secondary stage; an annular rocket motor comprising an annular combustion chamber concentrically encircling and secured to said booster stage; an annular nozzle operatively connected to said annular combustion chamber, pointed forward and canted outwardly from said booster stage; a fairing strip secured to said annular nozzle to seal said annular nozzle and to reduce air drag on the booster stage; an annular, internal burning charge comprising two spaced, concentric right hollow cylinders of solid propellant positioned in said annular combustion chamber; and means to ignite said annular charge so as to disengage said booster stage from said secondary stage.

References Cited in the file of this patent

UNITED STATES PATENTS

| | | |
|---|---|---|
| 989,375 | Luciani | Apr. 11, 1911 |
| 1,102,653 | Goddard | July 7, 1914 |
| 2,539,643 | Smythe | Jan. 30, 1951 |
| 2,613,497 | MacDonald | Oct. 14, 1952 |
| 2,623,465 | Jasse | Dec. 30, 1952 |
| 2,693,327 | Hild | Nov. 2, 1954 |
| 2,804,823 | Jablansky | Sept. 3, 1957 |
| 2,816,418 | Loedding | Dec. 17, 1957 |

FOREIGN PATENTS

| | | |
|---|---|---|
| 5,099 | Great Britain | Dec. 12, 1878 |